United States Patent [19]

Comte

[11] Patent Number: 4,826,314
[45] Date of Patent: May 2, 1989

[54] ECHOMETER FOR LOCATING DEFECTS WHICH AFFECT LIGHT CONDUCTORS

[75] Inventor: Georges Comte, Lyon, France

[73] Assignee: Les Cables De Lyon, Lyon Cedex, France

[21] Appl. No.: 392,912

[22] Filed: Jun. 28, 1982

Related U.S. Application Data

[63] Continuation of Ser. No. 171,508, Jul. 23, 1980, abandoned, which is a continuation of Ser. No. 906,709, May 17, 1978, abandoned.

[30] Foreign Application Priority Data

May 31, 1977 [FR] France .................. 77 16568

[51] Int. Cl.$^4$ .......................................... G01N 21/88
[52] U.S. Cl. .................................................. 356/73.1
[58] Field of Search .......................................... 356/73.1

[56] References Cited

U.S. PATENT DOCUMENTS 4,012,149  3/1977  Bouillie et al. .................. 356/73.1

Primary Examiner—Vincent P. McGraw
Attorney, Agent, or Firm—Sughrue, Mion, Zinn, Macpeak & Seas

[57] ABSTRACT

An echometer which translates an optical signal into the centimetric or decimetric wave bands. A test signal and the local oscillator signal are provided by a single laser oscillator. The test signal and the local oscillator signal, which are 90° different in phase, are modulated at centimetric or decimetric frequencies, and detected by mixing echo signals and the local oscillator signal with a photodiode or the like.

7 Claims, 1 Drawing Sheet

ECHOMETER FOR LOCATING DEFECTS WHICH AFFECT LIGHT CONDUCTORS

BACKGROUND OF THE INVENTION

This is a continuing application of application Ser. No. 171,508, filed July 23, 1980, which is a continuing application of application Ser. No. 906,709, filed May 17, 1978, both abandoned.

The present invention relates to an echometer for locating defects in an optical conductor. Such conductors, in particular optical fibers, constitute a very promising transmission means because of their low attenuation and large frequency bandwidth, and also due to the use of carrier frequencies in the visible or infrared ranges.

However, the transmission quality of such conductors depends on the regularity of local characteristics, specifically, regularity of the diameter of the conductor and regularity of the refractive index profile along the fiber. To date, there have been very few ways available for checking such regularity along the length of a conductor. Thus, it has been the practice to apply techniques used for conventional electric cables to such fibers. Specifically, pulses are applied to the input of the line under test and the return echoes observed. The precise instant of arrival of the echoes is determined, relative to the transmission time of the input pulses, to locate any defects which might be present.

If such a technique is implemented by exciting an optical fiber by means of light pulses from a laser, for example, a gallium arsenside laser, and by detecting the echoes by means of a photodiode, for example, a phototransistor or photomultiplier, the echo signals obtained will be proportional to the square of the amplitude of the irregularities which gave rise to them due to the square-law characteristics of all low level optical detectors. This phenomenon is a great hindrance because only large defects such as fiber breaks can be detected. It is impossible, because of the poor sensitivity of these detectors at low signal levels, to sense minor defects, which may in fact be numerous.

A considerable improvement could be obtained if it were possible to use linear voltage detection of the returned echo signals, However, this necessitates the translation of the echo signals into a lower frequency band (into decemetric or centimetric waves, for example) for which there exist linear amplifiers and detectors. Unfortunately, attempts made up until the present time to accomplish such a translation have not succeeded since the frequency translation necessitates the provision of a local oscillator whose frequency has an extremely stable difference in relation to the carrier frequency of the light pulse generator. This is very difficult in the case of two independent oscillators which operate at optical frequencies due to the magnitude of the frequencies involved, for instance, $3 \times 10^{14}$ Hz for a wavelength of 1 μm.

SUMMARY OF THE INVENTION

Preferred embodiments of the present invention overcome these difficulties by translating in a stable manner optical signals into the decimetric or centimetric waveband.

The present invention provides an echometer for locating defects in an optical conductor, the echometer comprising means for generating an optical test signal to be injected into an optical conductor under test, means for receiving return echoes reflected from defects in the optical conductor under test, and means for translating the return echoes into centimetric or decimetric waves for accurate detection of the instants of arrival of the return echoes, wherein both the test signal and the local oscillator signal for translating the return echoes are obtained from a single continuously operating oscillator at an optical frequency.

DESCRIPTION OF THE PREFERRED EMBODIMENTS

Figure 1:
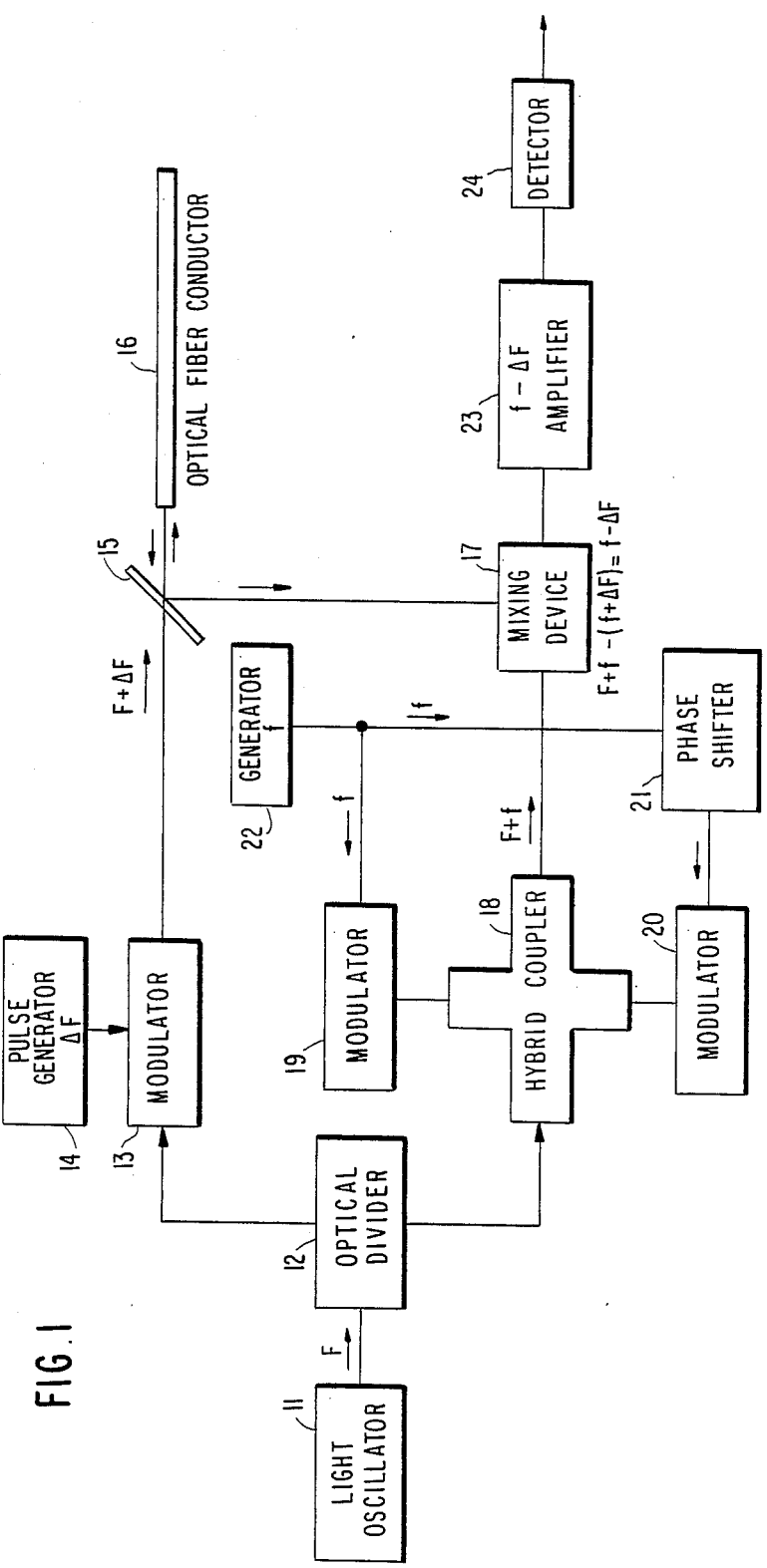
FIG. 1 is a block diagram illustrating an echometer of the invention.

An echometer constructed in accordance with the present invention is illustrated by way of a nonlimiting example in FIG. 1. This echometer is constructed and operates as follows.

A light or infrared oscillator 1, for example a helium-neon laser (operating at 632.8 nm) or a gallium arsenside laser (operating between 820 and 850 nm) or an yttrium-aluminum garnet (YAG) laser (operating at about 1050 nm) supplies continuous power at a frequency F. This signal is divided into two parts by an optical divider 12, which may be implemented with coupled optical fibers or by glass depostied on a substrate. Part of the light is then applied to a modulator 13, which may be of the electro-optical type, for example, a Kerr cell, or of the acousto-optical type, for example, a birefringent crystal or an absorption crystal. This modulator receives a modulating signal input from a pulse generator 14 which produces pulses of a short duration. In the event that the echo signals are to be observed in the frequency domain, a swept frequency oscillator may be employed for the pulse generator 14. The frequency $\Delta F$ of the modulator 14 can be up to 500 MHz.

The result of this modulation is a signal in the $F + \Delta F$ frequency band. The optical signal thus modulated is applied to the input end of a fiber 16 under test through a semi-transparent plate 15 inclined at 45° to the axis of the fiber so that the received echo signals are deflected in a direction perpendicular to the axis of the incident beam toward a mixing device 17.

The other part of the optical power at the frequency F is applied to a four-port T-type hybrid coupler 18. This coupler is analogous to the one described in the article by S. E. Miller (Integrated Optics, Bell System Technical Journal, Vol. 48, No 7, September, 1969, p. 2059, which is the equivalent in optics of the "magic" or hybrid T which is well known in ultra-high frequencies.

The optical power applied to the hybrid coupler 18 is divided thereby into two halves; one is amplitude modulated by an oscillator having a frequency of f by means of a modulator 19, which is similar to the modulator 13, and the other half modulated at the same frequency by a modulator 20, which is also similar to the modulator 13 and which is supplied with an input modulating signal at the frequency of f shifted ±90° in phase with respect to the output signal from the generator 22 by a phase shifter 21. The two signals at a frequency of f are thus produced by the same generator 22. The frequency f can be between 500 and 5,000 MHz.

If the output signals at a frequency of f from the generator 22 and the phase shifter 21 have the same amplitude, and if the hybrid coupler 18 and the modulators 19 and 20 are suitably balanced, an optical wave at the frequency F+f and having only one sideband emerges from the fourth branch of the hybrid couple 18. This wave represents a translation in frequency of the input signal at the frequency F.

This wave, translated in frequency to F+f, is applied to one input port of the mixer 17, to the other input port of which is applied the echo signals at a frequency of F+ΔF. The mixer 17 can be constituted by a photodiode of the PN type, by an avalanche-type photodiode, or by a phototransistor.

A signal with a frequency of F+f−(F+ΔF)=f−ΔF is provided at the output of the mixer 17. If the translation frequency f is chosen to be in the decimetric or centimetric wave range, the echo signal transposed to the frequency f−ΔF is itself within the range of decimetric or centimetric waves (ΔF being much smaller than f), and hence can be amplified without difficulty by a vacuum tube or transistorized travelling wave amplifier 23, so that those signals can be brought to a sufficient level to be detected linearly by a conventional type of electronic detector 24 (for example a silicon detector) and then observed on an oscilloscope or recorded.

The set of optical circuits 11 to 17 inclusive could be formed either by separate components interconnected by light conductors or optical fibers, or on a block on a substrate by "integrated optics" techniques of thin layer deposition without going beyond the limits of the claimed invention. Other auxiliary devices such as filters, attenuators, etc., could also be added without going beyond the scope of the invention.

This completes the description of the preferred embodiments of the invention. Although preferred embodiments have been described, it is believed that numerous modifications and alterations thereto would be apparent to one of ordinary skill in the art without departing from the spirit and scope of the invention.

I claim:

1. An echometer for locating defects in an optical conductor, said echometer comprising means for generating an optical test signal to be injected into an optical conductor under test, means for receiving return echoes reflected from defects in the optical conductor under test, and means for providing a local oscillation for transposing the return echoes into centimetric or decimetric waves for detection of the instants of arrival of the return echoes, wherein both the test signal and the local oscillation for transposing the return echoes are obtained from a single continuous oscillation at an optical frequency F.

2. An echometer according to claim 1, wherein said single continuous oscillation is provided by an unmodulated laser oscilator.

3. An echometer according to claim 1, further comprising an optical divider, wherein the single continuous oscillation is divided into two signals by said optical divider.

4. An echometer according to claim 3, further comprising modulation means, wherein the test signal has a frequency of F+ΔF and is obtained by a selected one of frequency and pulse modulation of a predetermined one of the two signals leaving the optical divider at said modulation means.

5. An echometer according to claim 3, further comprising a T-shaped hybrid coupler, wherein the local oscillation has a frequency of F+f and is obtained by applying one of the two signals from the optical divider to said T-shaped hybrid coupler, said hybrid coupler having two other inputs to which oscillations are applied at a frequency f and having a phase difference of +90° therebetween.

6. An echometer according to claim 5, further comprising a photodiode mixer, wherein the return echoes and the local oscillation are mixed by means of said photodiode mixer.

7. An echometer according to claim 1 including an amplifier for decimetric or centimetric waves with which the frequency-translated return echoes are amplified to a sufficiently high level for linear amplitude detection to be possible.

* * * * *